United States Patent
Yajima et al.

(10) Patent No.: US 7,633,545 B2
(45) Date of Patent: Dec. 15, 2009

(54) FOCUS DETECTING SYSTEM

(75) Inventors: Shinya Yajima, Saitama (JP); Hiroshi Kato, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 638 days.

(21) Appl. No.: 11/064,829

(22) Filed: Feb. 25, 2005

(65) Prior Publication Data

US 2005/0195310 A1 Sep. 8, 2005

(30) Foreign Application Priority Data

Mar. 4, 2004 (JP) .......................... P.2004-060721

(51) Int. Cl.
*H04N 5/232* (2006.01)
(52) U.S. Cl. ..................... 348/349; 396/119
(58) Field of Classification Search ........ 348/345, 348/350, 243; 359/698; 396/101, 119
See application file for complete search history.

(56) References Cited

U.S. PATENT DOCUMENTS

| | | | | |
|---|---|---|---|---|
| 4,570,185 | A * | 2/1986 | Arai et al. ..................... | 348/345 |
| 4,803,352 | A * | 2/1989 | Bierleutgeb ............... | 250/201.3 |
| 5,231,443 | A * | 7/1993 | Subbarao ..................... | 396/93 |
| 6,689,998 | B1 * | 2/2004 | Bremer ..................... | 250/201.2 |
| 7,233,358 | B2 * | 6/2007 | Yoshikawa .................. | 348/340 |
| 7,262,805 | B2 * | 8/2007 | Yahagi et al. ............... | 348/350 |
| 7,345,706 | B2 * | 3/2008 | Kanayama et al. .......... | 348/353 |
| 2003/0174231 | A1 * | 9/2003 | Yahagi et al. ............... | 348/345 |
| 2003/0174413 | A1 * | 9/2003 | Yahagi et al. ............... | 359/698 |

FOREIGN PATENT DOCUMENTS

| | | |
|---|---|---|
| JP | 2003-270517 A | 9/2003 |
| WO | WO 02/03105 | 1/2002 |

OTHER PUBLICATIONS

Office Action dated Mar. 19, 2007 for corresponding European Application No. 05004151.6.

* cited by examiner

*Primary Examiner*—David L Ometz
*Assistant Examiner*—Ahmed A Berhan
(74) *Attorney, Agent, or Firm*—Harness, Dickey & Pierce, P.L.C.

(57) ABSTRACT

A focus detecting system for detecting the focus state of a taking lens capable of changing a focal distance, in which an object light to be guided to an imaging element for image production by the taking lens is branched and captured by a plurality of imaging elements for focus state detection having an optical path length difference, and the focus state is detected on the basis of image signals acquired from the plurality of imaging elements for focus state detection, includes: a moving unit for moving the imaging elements for focus state detection back and forth in an optical axis direction; and an optical path length difference changing unit for changing the optical path length difference between the imaging elements for focus state detection by shifting a position of each of the imaging elements for focus state detection according to a focal distance of the taking lens using the moving unit.

11 Claims, 9 Drawing Sheets

FOCUS DETECTING SYSTEM

BACKGROUND OF THE INVENTION

1. Technical Field of the Invention

This invention relates to a focus detecting system, and more particularly to a focus detecting system which is employed for just focus detection in autofocus control of a taking lens. This invention also relates to a method for detecting a focus state of a taking lens. The foregoing methods may be implemented as a set of computer-readable instructions stored in a computer readable medium such as a data carrier.

2. Description of the Related Art

As a system for controlling focus by making a focus adjustment so as to maximize a focus evaluation value, what is called a hill-climbing mode has been proposed in which the focus is moved in a direction of increasing the focus evaluation value and stopped at a position where the focus evaluation value ceases to increase.

This hill-climbing mode is generally a system in which any one of front focus, back focus and just focus of the focus state is detected by wobbling of minutely moving the focus thereby to move the focus in the direction of just focus, i.e. of increasing the focus evaluation value. The hill-climbing mode, therefore, provides a fear that the change in the focus by the wobbling can be visualized on a screen. The hill-climbing mode presents a problem that the time taken until just focus is lengthened by the degree of wobbling.

On the other hand, for example, JP-A-2003-270517 discloses a focus detecting system which can detect the focus state without performing the wobbling using a plurality of imaging elements for focus detection having an optical path length difference.

In this focus detecting system, an object light incident on a taking lens is branched by a half mirror, and one of the branched lights is incident on an imaging plane of an imaging element for image production for acquiring an image signal for recording or reproducing (hereinafter simply referred to as an imaging element for image production), whereas the other (light for detecting the focus state) of the branched lights is further branched and incident on imaging planes of two imaging elements for focus state detection for acquiring the image signal for detection of the focus state (hereinafter referred to as imaging elements for focus state detection). These two imaging elements for focus state detection are located at the positions where on their imaging planes, the optical path is shorter and longer by equal distances than that on the imaging plane of the imaging element for image production. The focus state is acquired according to the magnitude relation of the two focus evaluation values which are calculated on the basis of the image signals acquired by the imaging elements for focus state detection. Specifically, the focus evaluation value acquired from each of the imaging elements for focus state detection corresponds to the focus evaluation value calculated on the basis of the image signal acquired by the imaging element for image production when the focus (focal point) of the taking lens is shifted from the present position to a near side and an infinite side by the equal distances. Thus, when these focus evaluation values are compared, if they agree with each other, it is determined that the focus state is just focus. If they are different, it is determined that focus state is front focus or back focus according to that either of these focus evaluation values is larger or smaller than the other. Thus, the focus evaluation values when the focus is shifted to the near side and the infinite side are simultaneously acquired by the image signals obtained from the imaging elements for focus state detection without actually moving the focus so that the focus state can be detected promptly without performing the wobbling.

Meanwhile, in the focus detecting system disclosed in JP-A-2003-270517, the imaging elements for focus state detection must be arranged so that their imaging planes provide a suitable optical path length difference. For example, if the optical path length difference is larger, the focus evaluation value obtained from each of the imaging elements for focus state detection represents the focus evaluation value obtained from the imaging element for image production when the focal point is largely shifted to the near side and the infinite side. If the optical path length difference is too large, the focus evaluation value at a low level is only obtained from either of the imaging elements for focus state detection in the vicinity of just focus so that in the case of out-of-focus, the difference between the focus evaluation values cannot be detected. On the other hand, if the optical path length difference is too small, the focus evaluation values obtained from the imaging elements for focus state detection are nearly equal so that the difference in the focus evaluation values cannot be detected. For this reason, where the focus of the taking lens is changed in the vicinity of just focus, it is desirable to set the optical path length difference so that the focus evaluation values obtained from the imaging elements for focus state detection largely vary in their opposite increasing/decreasing tendency.

However, in a case where the focal distance is variable like a zoom lens, when the focal distance is varied, the shifting quantity of the focal point corresponding to the optical path length difference in the imaging elements for focus state detection may vary largely. Namely, it has been confirmed that when the optical path length difference is fixed in a certain zoom lens, if the focal distance is set to be nearer to the side of a "wide lens terminal" (i.e. is made shorter), the shifting quantity of the focal point corresponding to the optical path length difference becomes larger. In such a case, a suitable optical path length difference cannot be set over the entire zooming range from the "wide lens terminal" to the "telescope terminal". Even if the optical path length difference is suitable on the side of the telescope terminal, it may be too large on the side of the wide lens terminal. Inversely, even if the optical path length difference is suitable on the side of the wide terminal, it may be too small on the side of the telescope terminal. This leads to a case where the difference in the focus evaluation values cannot be detected. This invention has been accomplished in view of such a circumstance.

SUMMARY OF THE INVENTION

An object of this invention is to provide a focus detecting system capable of detecting a focus state without being affected by the shifting quantity of a focal point.

In order to attain the above object, in accordance with this invention, there is provided a focus detecting system for detecting the focus state of a taking lens capable of changing a focal distance, in which an object light to be guided to an imaging element for image production by the taking lens is branched and captured by a plurality of imaging elements for focus state detection having an optical path length difference, and the focus state is detected on the basis of image signals acquired from the plurality of imaging elements for focus state detection, characterized by comprising: a moving unit for moving the imaging elements for focus state detection back and forth in an optical axis direction; and an optical path length difference changing unit for changing the optical path length difference between the imaging elements for focus state detection by shifting a position of each of the imaging elements for focus state detection according to a focal distance of the taking lens using the moving unit.

In accordance with this invention, each of the imaging elements for focus state detection can be moved back and forth along an optical axis direction of an object light for detecting the focus state thereby to set an optimum optical path length difference. Thus, a suitable optical path length difference can be set in an entire zooming range form a "wide lens terminal to a "telescope terminal", thus permitting the suitable focus state to be always detected.

The optical path length difference changing unit preferably shifts the position of each the imaging elements for focus state detection so that the optical path length difference increases as the focal distance of the taking lens increases. In accordance with this configuration, the suitable optical path length difference can be set in an entire zooming range from the "wide lens terminal" to the "telescope terminal", thus permitting a change in the focal distance to be always detected.

The focus detecting system is preferably applied to detecting of the focus state in an autofocus system for controlling the focus so that the focus of the taking lens is located at a just focus position. In accordance with this configuration, the suitable focus state can be always detected in the autofocus system.

In accordance with this invention, each of the imaging elements for focus state detection can be moved in an optical axis direction of an object light for detecting the focus state thereby to set an optimum optical path length difference. Thus, a suitable optical path length difference can be set in an entire zooming range form a "wide lens terminal" to a "telescope terminal", thus permitting the suitable focus state to be detected.

Another object of this invention is to provide a focus detecting method for detecting a focus state of an adjustable focus taking lens without being affected by the shifting quantity of a focal point.

The method includes: computing an optimum optical path length difference between a first imaging element for focus state detection and a second imaging element for focus state detection; comparing a present optical path length difference with the optimum optical path length difference; moving the first imaging element for focus state detection and the second imaging element for focus state detection, when the present optical path length is not satisfied with the optimum optical path length difference; and detecting the focus state.

The method preferably includes: when the present optical path length is smaller than the optimum optical path length difference, moving the first imaging element for focus state detection toward a near side and loading a first focus evaluation value, and moving the second imaging element for focus state detection toward an infinite side and loading a second focus evaluation value; when the present optical path length is larger than the optimum optical path length difference, moving the first imaging element for focus state detection toward the infinite side and loading the first focus evaluation value, and moving the second imaging element for focus state detection toward the near side and loading the second focus evaluation value; comparing the first focus evaluation value with the second focus evaluation value; and completing detecting the focus state when the first focus evaluation value and the second focus evaluation value have a same value.

The method preferably includes: when the first focus evaluation value and the second focus evaluation value have a different value, moving a focusing lens towards the near side in a case where a focus position is in the infinite side, and moving the focusing lens towards the infinite side in a case where the focus position is in the near side.

The present invention further includes a set of instructions in a computer-readable medium for executing the methods of the present invention.

DETAILED DESCRIPTION OF THE INVENTION

Now referring to the attached drawings, a detailed explanation will be given of various preferred embodiments of a focus detecting system according to this invention.

Figure 1:
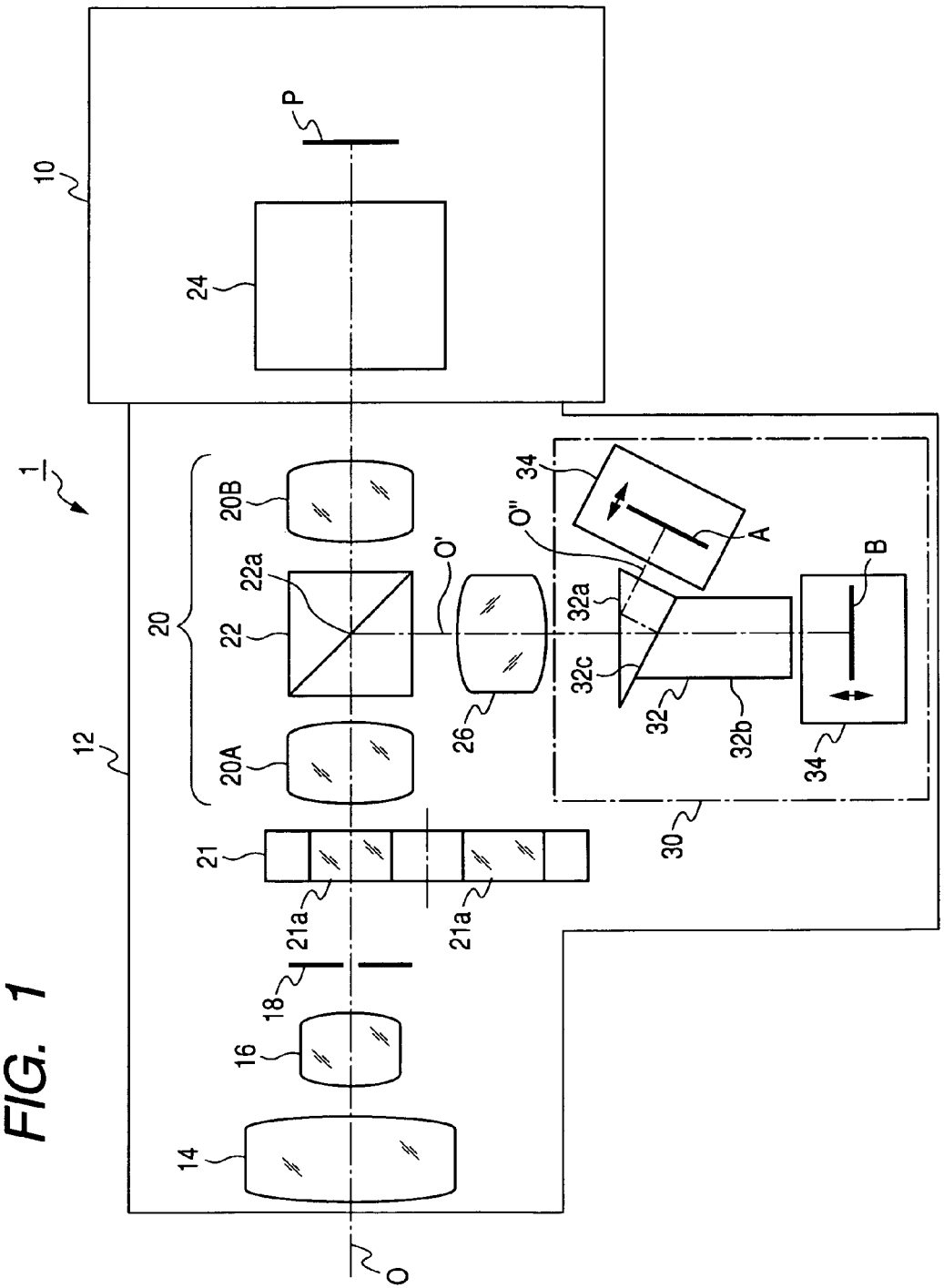
FIG. 1 is a configuration view of a television camera system to which the focus detecting system according to an embodiment of this invention is applied.

FIG. 1 is a configuration view of a television camera system to which the focus detecting system according to this invention is applied. As seen from FIG. 1, the television camera system 1 mainly includes a camera body 10 and a taking lens 12.

The camera body 10 includes an inherent imaging element for capturing an image to be captured and outputting an image signal in a predetermined format and recording the image on a recording medium (hereinafter simply referred to as an imaging element for image production). The taking lens 12 is detachably mounted on the mounting portion of the camera body 10.

The optical system of the taking lens 12 includes known devices such as a focus lens 14, a zoom lens 16, an iris 18 and a relay lens 20, and an extender 21.

The extender 21 is arranged between the iris 18 and the group of lenses 20, and is provided with a plurality of lens units 21a which are movable back and forth for an optical axis O. Each lens unit 21a includes a plurality of lenses with magnification of e.g. twice, equal, 0.8 times, etc.

The group of relay lenses 20 includes a front relay lens 20A and a rear relay lens 20B. On the optical axis O between the front relay lens 20A and the rear relay lens 20B, located is a half-mirror 22 for separating an object light for detecting the focus state (hereinafter simply referred to as a detecting object light) from the object light incident through the taking lens 12. The half-mirror 22 is arranged with its mirror plane 22a inclined by about 45° from the optical axis O of the taking lens 12 so that the object light having passed the front relay lens 20A is reflected at a right angle and splitted to provide an optical axis O' from an object light for imaging (hereinafter referred to an imaging object light).

The object light having passed through the half mirror 22 is emitted from the rear end of the taking lens 12 as the imaging object light and incident on an imaging portion 24 of the camera body 10. Although a detailed explanation will not given of the configuration of the imaging portion 24, the object light incident on the imaging portion 24 is separated into three colors of a red light, a green light and a blue light through a color separating optical system. These lights are incident on the corresponding imaging planes of imaging elements for image production for the respective colors, thereby capturing a color image for broadcasting. Also, reference symbol P denotes a position optically identical to the imaging plane of the imaging element for image production illustrated as a focusing plane P on the optical axis O of the taking lens 12.

The object light reflected by the half-mirror 22 proceeds as the object light for detecting the focus state along the optical axis O' perpendicular to the optical axis O, and is incident on a focus state detecting unit 30 through an imaging position changing lens 26.

The focus state detecting unit 30 includes a beam splitter 32 for splitting the detecting object light into two equal parts, two imaging elements for focus state detection A, B for detecting the focus state (hereinafter simply referred to as imaging elements for focus state detection A, B) on which the two equal parts of the object light splitted by the beam splitter 32 are incident, respectively, and a driving device 34 for driving these imaging elements for focus state detection A, B.

The beam splitter 32 is composed of two prisms 32a and 32b. The focus state detecting object light separated from the imaging object light by the half mirror 22 as described above proceeds along the optical axis O', and is first incident on the prism 32a. In this prism 32a, the incident light is splitted into a reflected light and a passed light. The reflected light is incident on the focus state detecting element A (optical axis O"), whereas the passed light is incident on the prism 32b and thereafter incident on the focus state detecting element B.

The imaging elements for focus state detection A, B may be e.g. a CCD for capturing a monochromatic image, or a CCD for capturing a color image.

The driving devices 34 drive the imaging elements for focus state detection A, B along the detecting object lights, respectively. Since the driving devices 34, provided for the imaging elements for focus state detection A, B, respectively, have the same structure, a detailed explanation will be given of the driving device 34 on the side of the focus state detecting element A.

Figure 2A:
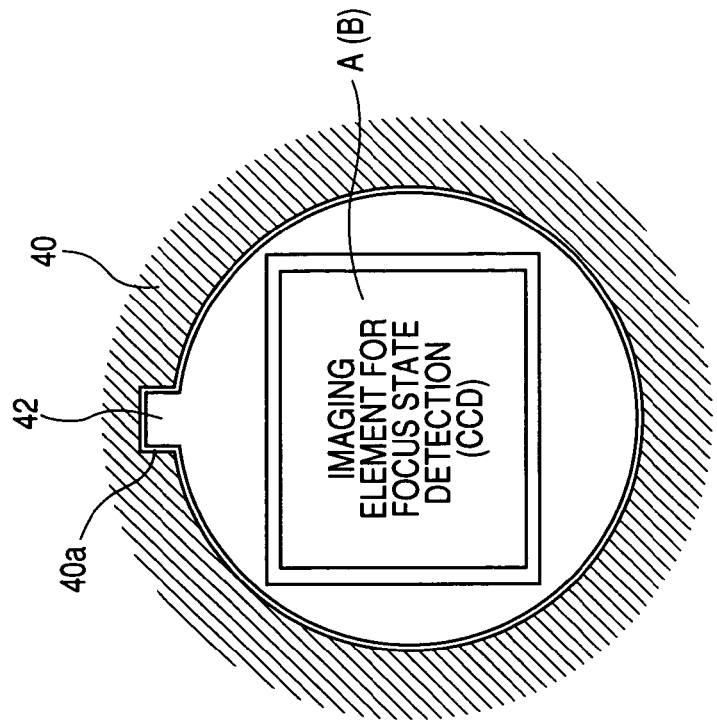
FIGS. 2A and 2B are a side view and a front view respectively showing the details of the driving device in the focus detecting system according to an embodiment of this invention.
Figure 2B:
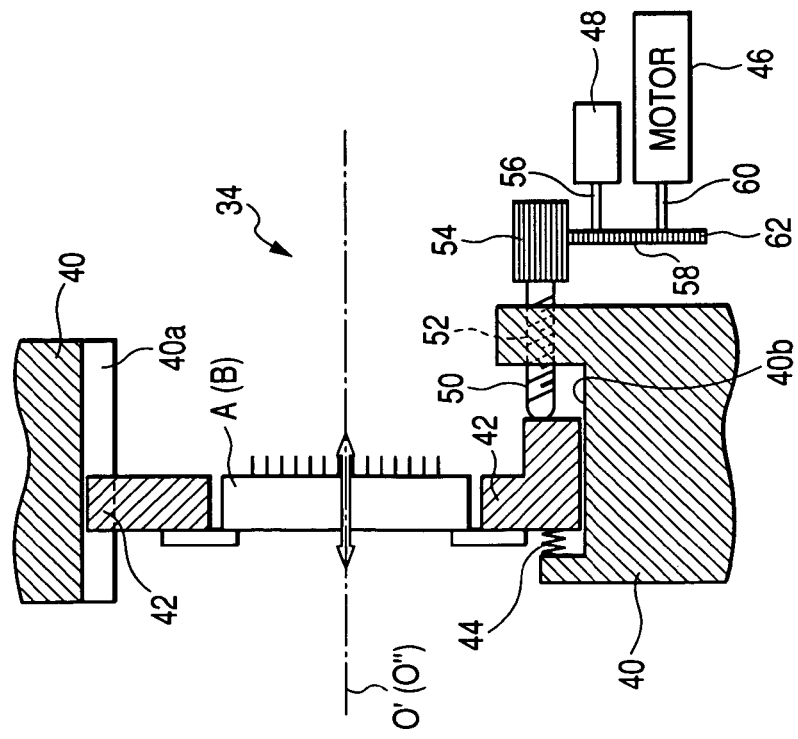

As seen from FIGS. 2A and 2B, the driving device 34 includes a holding frame 40 mainly provided on the side of the taking lens 12, a frame 42 for supporting the focus state detecting element A(B), a spring 44, a motor 46, a potentiometer 48 and a rotary shaft 50 equipped with a male screw on the outer periphery.

The holding frame 40 has guiding grooves 40a, 40b formed in parallel to the optical axis O' (O"). The guiding groves 40a, 40b slidably supports the frame 42 in parallel to the optical axis O' (O"). If the frame 42 is slid along the guiding grooves 40a, 40b, the focus state detecting element A supported by the frame 42 can be moved back and forth along the optical axis O' (O") (arrow in FIG. 2A).

At the edge of the guiding groove 4Db of the holding frame 40, the spring 44 is provided for applying energy to the frame 42. The frame 42 is always biased by this spring 44 in an upper right direction in FIG. 2A.

On the other hand, at the edge of the guiding groove 40b opposite to the spring 44 of the holding frame 40, a supporting slot 52 is formed for rotatably supporting the rotary shaft 50. On the inner periphery of the supporting slot 52, a female screw is formed to be screw-engaged with the above male screw of the rotary shaft 50. The front end (left side in FIG. 2A) of the rotary shaft 50 is kept in contact with the frame 42 so that the frame 42 is biased in a leftward direction in FIG. 2A against the energy applied by the spring 44 through the feeding operation of the screw based on the rotational movement of the rotary shaft 50 and the translatory movement operation thereof.

A gear 54 is attached to the rear end of the rotary shaft 50. The gear 54 is geared with a gear 58 attached to the input shaft 56 for rotation detection of the potentiometer 48. The gear 58 is geared with a gear 62 attached to the output shaft 60 of the motor 46.

When the motor 46 is driven by the driving device 34 having the configuration described above, the focus state detecting element A(B) supported by the frame 42 can be driven back and forth along the optical axis O' (O"). The rotation of the gear 58 is detected by the potentiometer 48. Further, the position of the focus state detecting element A(B) is detected through the detection of the rotation by the potentiometer 48. Its details will be described later.

Figure 3:
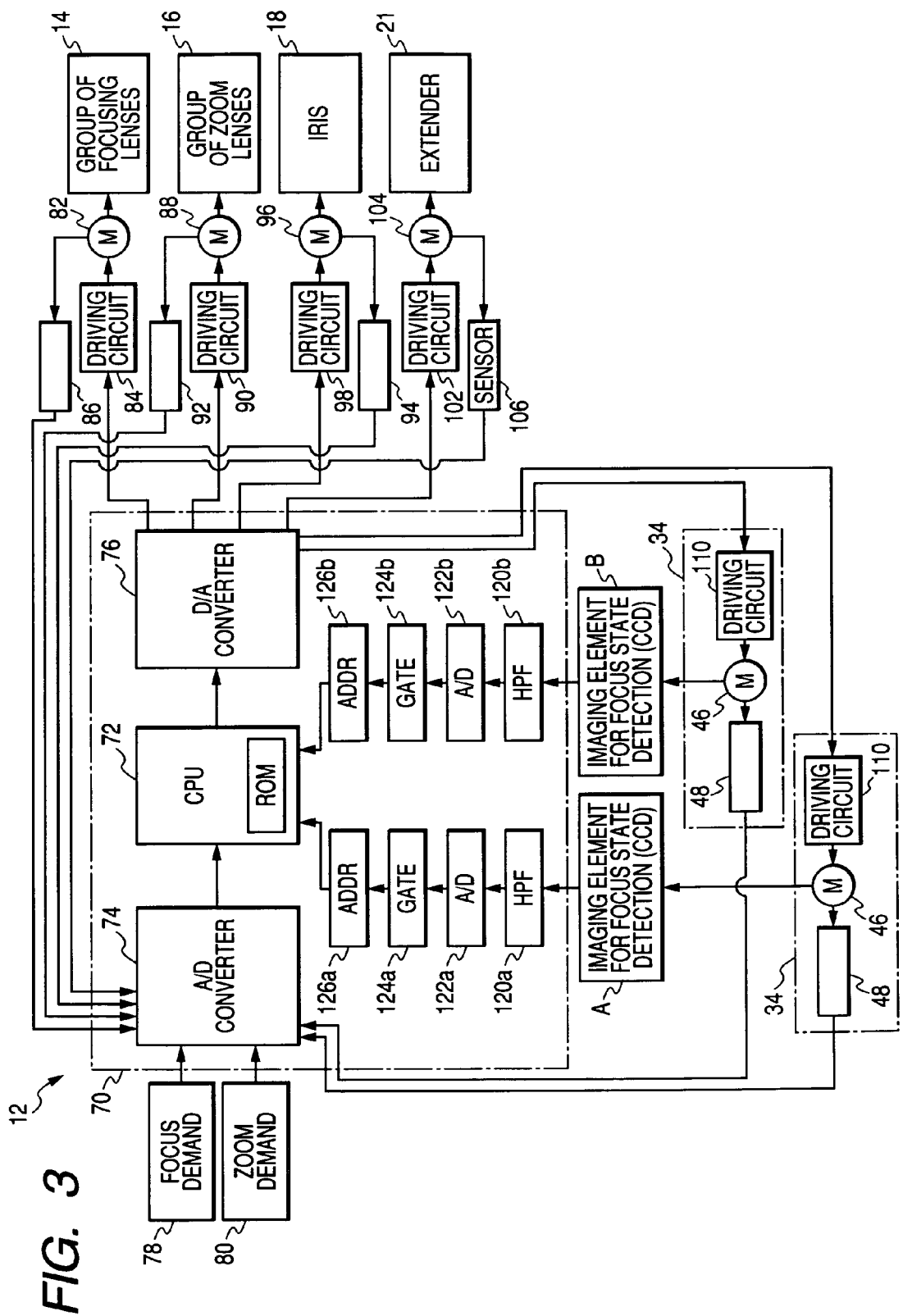
FIG. 3 is a block diagram of the internal structure of a focus detecting system and a taking lens according to an embodiment of this invention.

FIG. 3 is a block diagram of the taking lens 12 showing the driving devices 34 and a signal processing unit 70 etc. The signal processing unit 70 serves to receive the image captured by each of the imaging devices A, B and detect the focus state of the taking lens 12 on the basis of the image signal thus obtained. The signal processing unit 70 includes not only a central processing unit (CPU) 72 serving as a control means but also an A/D converter 74, a D/A converter 76, a focus demand 78 and a zoom demand 80.

The CPU 72 serves as the control means for controlling the respective devices such as the group of focus lenses 14 and group of zoom lenses 16 within the taking lens 12 according to a predetermined program and also serves as the control means for controlling the imaging elements for focus state detection A, B. Also, the CPU 72 includes a ROM in which control programs and various data necessary for control and operation are stored and a RAM (not shown) employed as a storage region for working.

The focusing of the taking lens 12 is controlled through manual focus (MF) or auto-focus (AF).

During the MF, the focus demand 78 supplies focus demand data to the CPU 72 through the A/D converter 74. The focus demand data are data for designating the moving position of the group of focus lenses 14 according to the rotating quantity of a focus knob (not shown) provided on the outer periphery of the taking lens 12. The CPU 72 supplies the control signal to a driving circuit 84 for a focus motor 82 on the basis of the focus demand data, thereby driving the group of focus lenses 14 of the taking lens 12. Also, the CPU 72 computes the moving speed of the group of focus lenses 14 on the basis of the acquired focus demand data and the position data of the group of focus lenses 14 supplied through the A/D converter 74 from the potentiometer 86 for focusing.

On the other hand, the zoom demand 80 supplies zoom demand data to the CPU 72 through the A/D converter 74. The zoom demand data are data for designating the moving speed of the group of zoom lenses 16 according to the rotating direction and rotating quantity of a zoom ring rotatably provided on the outer periphery of the taking lens 12. The CPU 72 supplies the control signal to a driving circuit 90 for a zoom motor 88 on the basis of the focus demand data, thereby driving the group of zoom lenses 14 of the taking lens 12. Also, the CPU 72 computes the moving quantity of the group of zoom lenses 16 on the basis of the acquired zoom demand data and the position data of the group of focus lenses 14 supplied through the A/D converter 74 from a potentiometer 92.

Further, the CPU 72 computes the driving quantity of an iris motor 96 on the basis of stop value data supplied from a potentiometer 94 for the iris 18 through the A/D converter 74 and the iris control signal supplied from the camera body 10, and supplies the control signal for the iris motor 96 to a driving circuit 98 for the iris motor 96 through the D/A converter 76.

Further, according to the operation of an extender selecting lever provided on the outer periphery of the taking lens 12, the CPU 72 supplies a lens unit changing signal for the extender 21 to a driving circuit 102 for the extender 21 through the D/A converter 76. In response to the lens unit changing signal, the driving circuit 102 drives the motor 104 for driving the extender 21, thereby moving the lens unit onto the optical axis O (FIG. 1). Also, reference numeral 106 denotes a sensor for detecting the kind of the lens unit moved onto the optical axis O.

During the AF, the images captured by the imaging elements for focus state detection A, B are supplied to the CPU 72 in the signal processing unit 70. The CPU 72 detects the focus state of the taking lens 12 on the image signals acquired from the imaging elements for focus state detection A, B. On the basis of the focus state thus detected, the CPU 72 supplies a control signal to the driving circuit 84 for the focus motor 82 through the D/A converter 76, thereby AF-controlling the focus of the taking lens 12. The AF control will be described later.

The motor 46 of the driving device 34 in the focus state detecting element A is operated on the driving signal from a driving circuit 110. The driving circuit 110 drives the motor 46 on the basis of the control signal supplied from the D/A converter 76 in the signal processing unit 70. Thus, the movement of the focus state detecting element A is controlled.

The potentiometer 48 detects the position of the focus state detecting element A on the basis of the rotation of the input shaft 56 (see FIG. 2A), and supplies the resultant position data to the A/D converter 74 in the signal processing unit 70.

The driving device 34 in the focus state detecting element B has also the same configuration as described above. The motor 46 is driven on the basis of the control signal supplied from the D/A converter 76, thereby controlling the movement of the focus state detecting element B. Further, the position of the focus state detecting element B is detected by the potentiometer 48 and the resultant position data are supplied to the A/D converter 74 in the signal processing unit 70.

The processing of detecting the focus state will be explained concretely. The images of the object captured by the imaging elements for focus state detection A, B are supplied into the signal processing unit 70 as video signals in a predetermined format, respectively. These images are converted into focus evaluation values (VA, VB) representative of image sharpness, i.e. image contrast through high pass filters 120a, 120b, A/D converters 122a, 122b, gate circuits 124a, 124b and adders 126a, 126b within the signal processing unit 70. Thereafter, these focus evaluation values are supplied to the CPU 72. For example, where the CCDs for capturing the monochromatic image are employed as the imaging elements for focus state detection A, B, the video signals sent from the imaging elements for focus state detection A, B to the signal processing unit 70 are luminance signals indicative of the luminance of each of the pixels constituting the corresponding picture screens.

The processing of acquiring each of the focus evaluation values will be explained. The video signal produced from the focus state detecting element A, B is supplied to the high pass filter (HPF) 120a, 120b to extract the high frequency components. The signals of the high frequency components extracted by the high pass filter 120a, 120b are converted into digital signals by the A/D converter 122a, 122b. Only the digital signals corresponding to the pixels within a predetermined area (e.g. screen central area) of the digital signals corresponding to one screen (one field) of the image captured by the focus state detecting element A, B is extracted by the gate circuit 124a, 124b. The values of the digital signals in the extracted area are added by the adder 126a, 126b. Thus, the sum of the values of the high frequency components of the video signal in a predetermined focus area is acquired. The value thus acquired represents the focus evaluation value VA, VB indicative of the sharpness of the image within a predetermined focus area.

Additionally, the focus state detecting element A, B and each circuit such as the gate circuit 124a, 124b is supplied with various synchronizing signals from the synchronizing signal generating circuit not shown, thereby taking synchronization of processing among the respective circuits. Further, the CPU 72 is supplied with a vertical synchronizing signal (V signal) for each field of the video signal from the synchronizing signal generating circuit.

On the basis of the focus evaluation values VA and VB thus obtained, the CPU 72 detects the present focus state of the taking lens 12 for the imaging plane (focusing plane P in FIG. 1) of the imaging element for image production.

An explanation will be given of the operation of the focus detecting system according to this invention.

Figure 4:
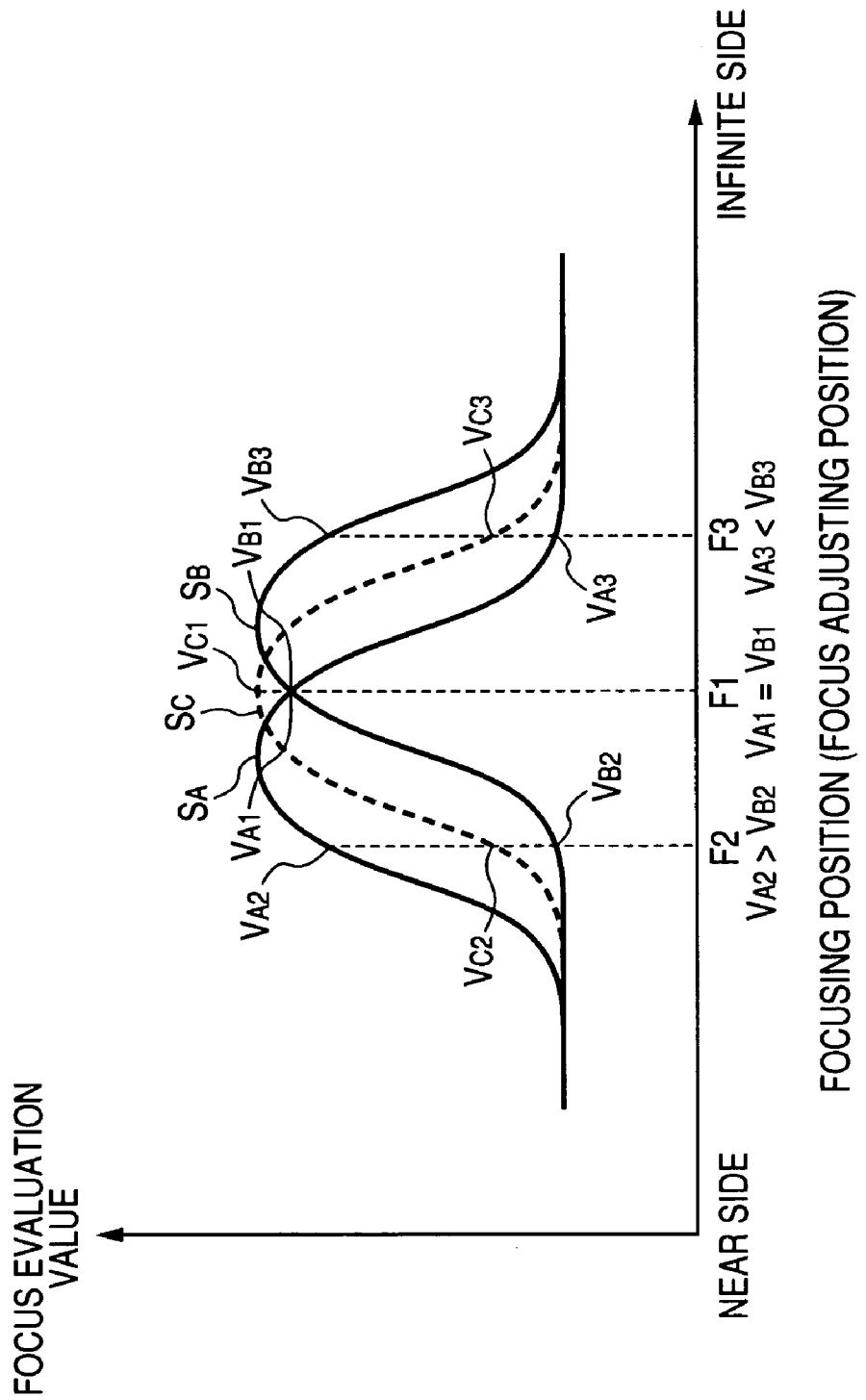
FIG. 4 is a graph showing the appearance of the focus evaluation value for the focusing position when a certain object is captured in the focus detecting system according to an embodiment of this invention.

First, the focus evaluation value will be explained. FIG. 4 is a graph of the focus evaluation value versus a focusing position when a certain object is captured, with a horizontal axis indicative of the focusing position of the taking lens 12 and a vertical axis indicative of the focus evaluation value. In the graph of FIG. 4, curves SA, SB indicated by solid line represent the focus evaluation values obtained from the imaging elements for focus state detection A, B. A curve SC indicated by broken line represents the focus evaluation value obtained from the imaging element for image production. A position where the focus evaluation value in the curve SC is the highest (maximum) is a just focus position of the imaging element for image production C.

Now, assuming that the focusing position of the taking lens 12 is set at the just focus position F1, the focus evaluation values obtained from the imaging elements for focus state detection A, B are the values VA1, VB1 corresponding to the position F1 in the curves SA, AB. In this case, the relationship among these focus evaluation values is such that the focus evaluation values VA1, VB1 from the imaging elements for focus state detection A, B are equal to each other and different from the focus evaluation value VC1 (VA1=VB1, VA1≠VC1, VB1≠VC1). Thus, if the focus evaluation values VA1, VB1 from the imaging elements for focus state detection A, B are equal to each other and the focus evaluation value VC1 is different from these focus evaluation values VA1, VB1, it can be seen that the focusing position of the taking lens 12 is in a state set at the just focus position F1.

On the other hand, if the focusing position of the taking lens 12 is set at position F2 on the near side with respect to the just focus position F1, the focus evaluation values obtained from the imaging elements for focus state detection A, B are the values VA2, VB2 corresponding to the position F2 in the curves SA, AB. In this case, the relationship among these focus evaluation values is such that the focus evaluation value VA2 obtained from the focus state detecting element A is larger than the focus evaluation value VB2 obtained from the focus state detecting element B (VA2>VB2). Like this, if the focus evaluation value VA2 obtained from the focus state detecting element A is larger than the focus evaluation value VB2 obtained from the focus state detecting element B, it can be seen that the focusing position of the taking lens 12 is in a state set at the near side with respect to the just focus position F1, i.e. in a state of front focus.

Likewise, if the focusing position of the taking lens is set at position F3 on the infinite side with respect to the just focus position F1, the focus evaluation values obtained from the imaging elements for focus state detection A, B are the values VA3, VB3 corresponding to the position F3 in the curves SA, AB. In this case, the relationship among these focus evaluation values is such that the focus evaluation value VA3 obtained from the focus state detecting element A is smaller than the focus evaluation value VB3 obtained from the focus state detecting element B (VA3<VB3). Like this, if the focus evaluation value VA3 obtained from the focus state detecting element A is larger than the focus evaluation value VB3 obtained from the focus state detecting element B, it can be seen that the focusing position of the taking lens 12 is in a state set at the infinite side with respect to the just focus position F1, i.e. in a state of back focus.

Figure 5:
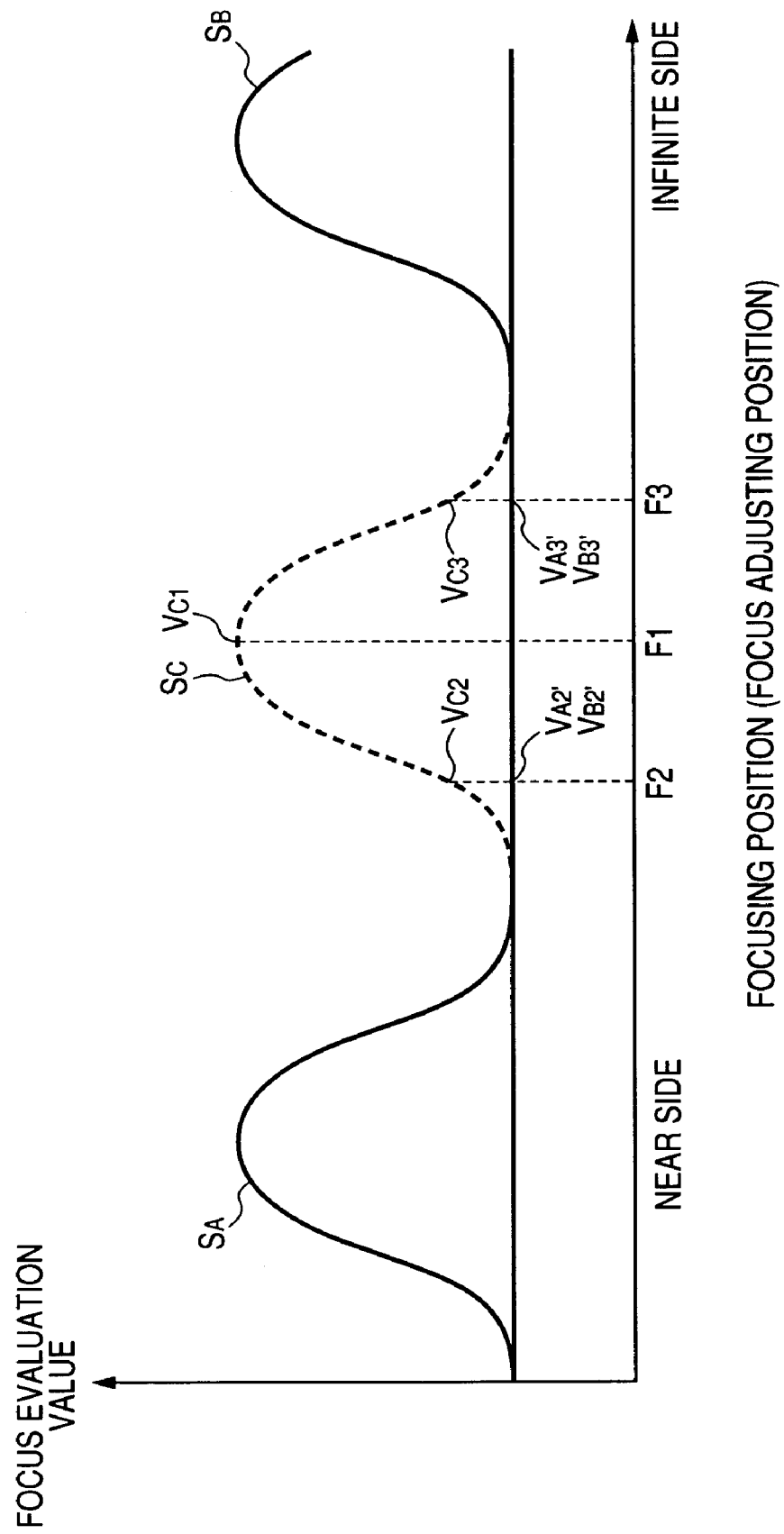
FIG. 5 is a graph showing the appearance of the focus evaluation value for the focusing position when a group of zoom lenses has been moved from a telescope side to a wide lens side by a predetermined quantity or more in the focus detecting system according to an embodiment of this invention.

Now, if the group of zoom lenses 16 of the taking lens 12 is operated so that its focal distance approaches the side of "wide lens terminal" (the focal distance is shortened), the changing quantity of the focusing position corresponding to the optical path length difference increases, as seen in FIG. 5, the curves SA, SB become apart from the focusing position. In this case, as the case may be, the difference between these focus evaluation values cannot be detected.

Specifically, in FIG. 5, if the focusing position of the taking lens 12 is set at the position F2, the focus evaluation values obtained from the imaging elements for focus state detection A, B at the position F2 are the focus evaluation values VA2' and VB2' from the imaging elements for focus state detection A, B respectively. In this case, both focus evaluation values VA2' and VB2' are approximately equal to each other so that the difference therebetween cannot be detected. Thus, it is possible to detect that the focusing position is in a state deviated from the just focus position. However, since the optical length path difference is too large, it is impossible to detect the direction and quantity of deviation of the focusing position.

Likewise, if the focusing position of the taking lens 12 is set at the position F3, the focus evaluation values obtained from the imaging elements for focus state detection A, B at the position F3 are the focus evaluation values VA3' and VB3' from the imaging elements for focus state detection A, B, respectively. In this case, both focus evaluation values VA2' and VB2' are approximately equal to each other so that the difference therebetween cannot be detected.

As described above, if it is difficult to detect the difference between the focus evaluation values, the positions of the imaging elements for focus state detection A and B are moved to decrease the focal distance difference therebetween to cause the curves SA and SB to approach, thereby permitting the focus state to be detected. Specifically, as seen from FIG. 6, the focus state detecting element A is moved to the position where its optical path length is increased by X1, whereas the focus state detecting element B is moved to the position where its optical path length is decreased by X2 (Hereinafter, the focus state detecting element A moved to the position where its optical path length is increased by X1 is referred as the focus state detecting element A+, and the focus state detecting element B moved to the position where its optical path length is decreased by X2 is referred to as the focus state detecting element B−).

Figure 7:
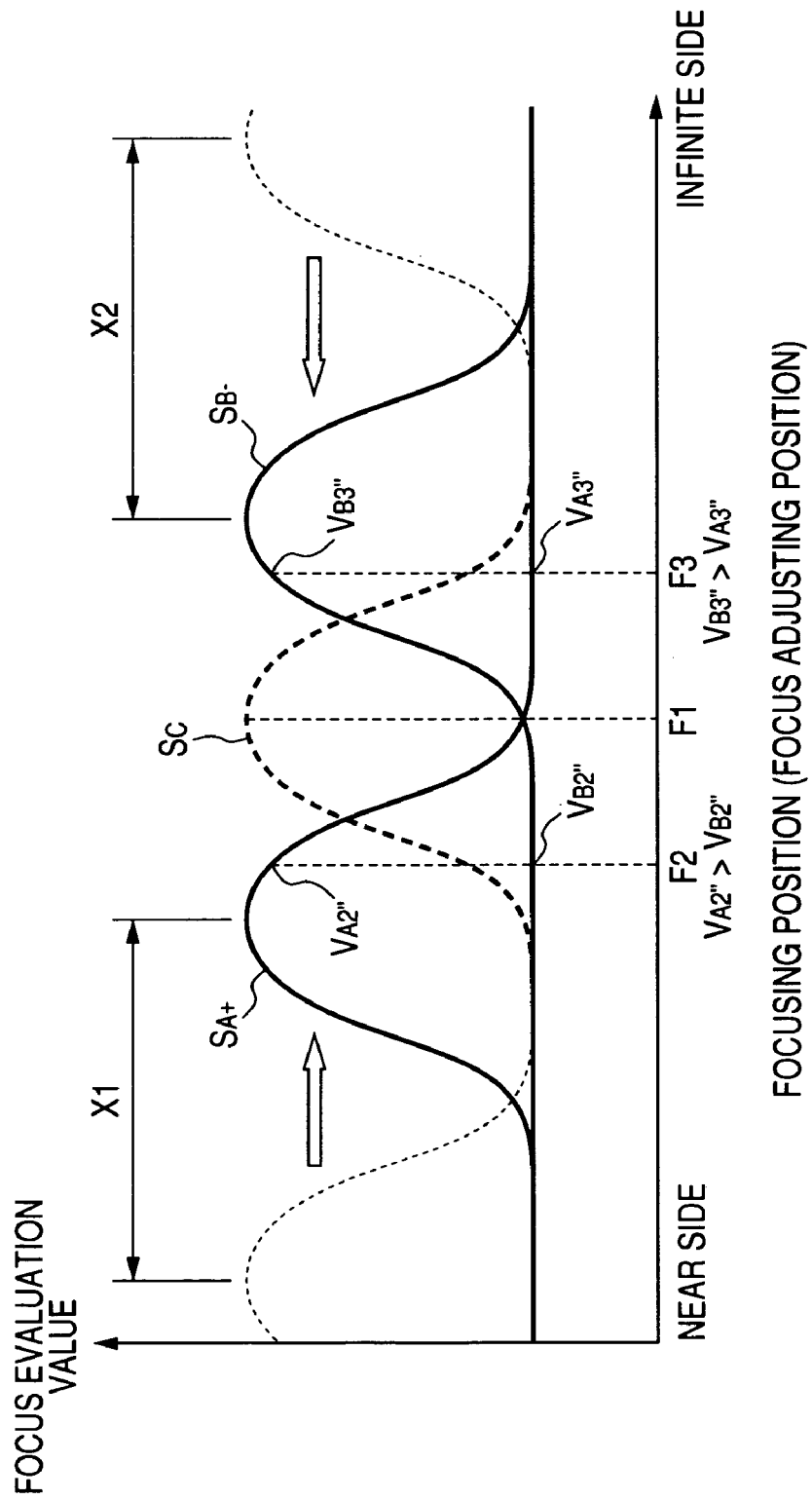
FIG. 7 is a graph showing another function of the focus detecting system according to an embodiment of this invention, i.e. the appearance of the focus evaluation values when the positions of the imaging elements for focus state detection are caused to approach with respect to the optical path length of the imaging element for image production.

By causing the imaging elements for focus state detection A, B to approach the optical path length of the imaging element for image production C by the distances X1, X2 (symbols A+, B−), the focus evaluation values obtained from the imaging elements for focus state detection A+, B− provide the focusing position moved corresponding to the distances X1, X2, thereby giving the curves SA+, SB− indicated by solid line in FIG. 7. In this case, if the focusing position of the taking lens 12 is set at the position F2, the focus evaluation values obtained from the imaging elements for focus state detection A, B are the values VA2", VB2" corresponding to the position F2 of the curves SA+, SB−, respectively.

Thus, it can be seen that the focus evaluation value VA2" obtained from the focus state detecting element A is larger than the focus evaluation value VB2" obtained from the focus state detecting element B. Accordingly, by comparing the focus evaluation values VA2" and VB2" with each other, it can be determined that the focusing position of the taking lens 12 is in a state set on the near side with respect to the just focus position.

Likewise, if it is assumed that the focusing position of the taking lens 12 is set at the position F3 as seen from FIG. 5, since the focus evaluation values VA3 and VB3 obtained from the imaging elements for focus state detection A and B are approximately equal to each other so that the focus state cannot be detected. However, as described above, by causing the imaging elements for focus state detection A, B to approach the optical path length of the imaging element for image production C by the distances X1, X2, it can be seen that the focus evaluation value VB3" from the focus state detecting element B is larger than the focus evaluation value VA3". Thus, it can be determined that the focusing position of the taking lens 12 is in a state set on the infinite side with respect to the just focus position.

Figure 8:
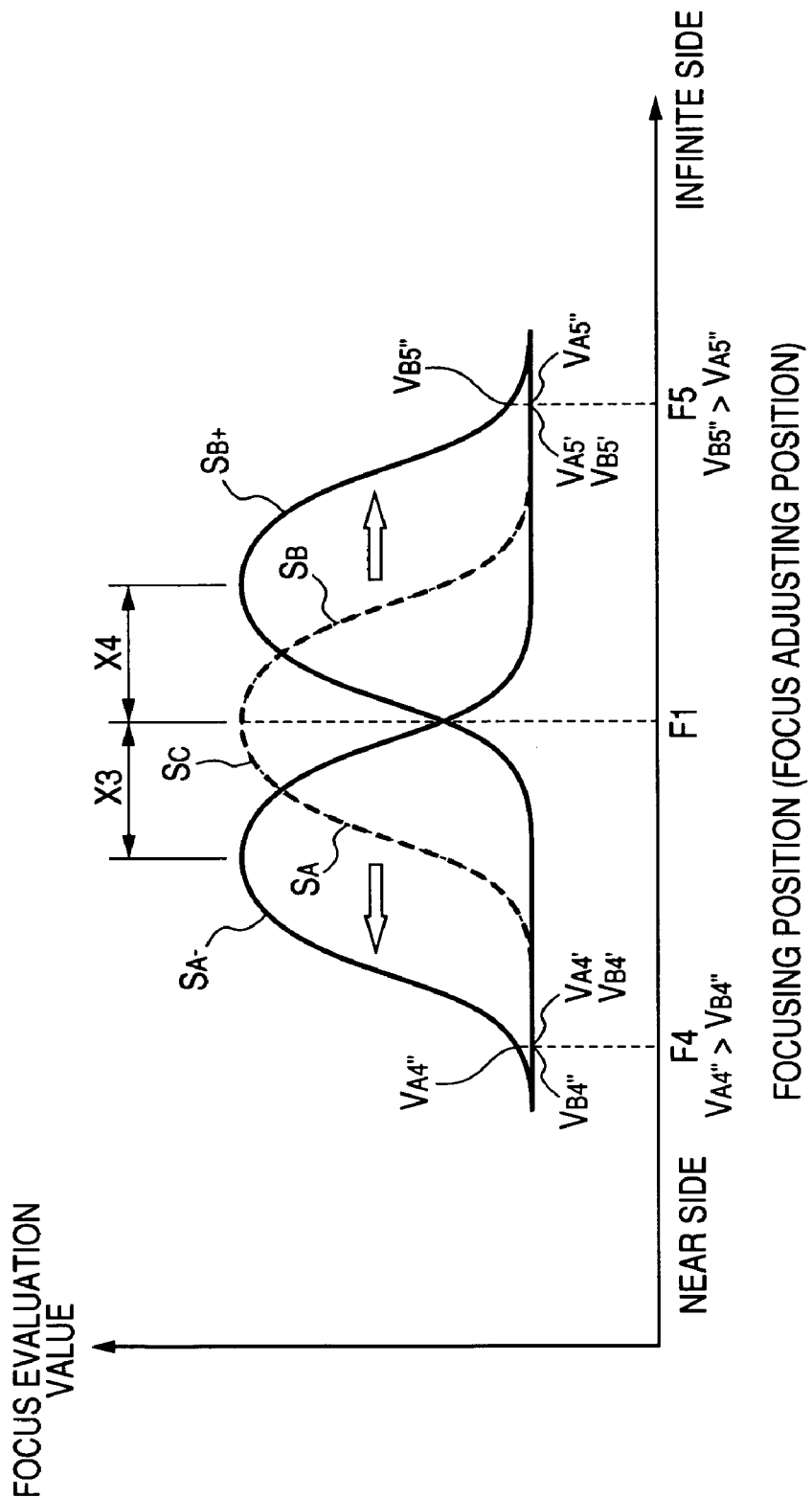
FIG. 8 is a graph showing still another function of the focus detecting system according to an embodiment of this invention, i.e. the appearance of the focus evaluation values when the positions of the imaging elements for focus state detection are caused to leave with respect to the optical path length of the imaging element for image production.

Further, if the focal distance is set to be nearer to the side of a "telescope lens terminal" (i.e. is made longer), as seen in FIG. 8, the curves SA, SB approach the focusing position. In this case, as the case may be, the difference between the corresponding focus evaluation values cannot be detected.

Specifically, in FIG. 8, if the focusing position of the taking lens 12 is set at the position F4, the focus evaluation values from the imaging elements for focus state detection A, B at this focusing position are the focus evaluation value VA4' from the focus state detecting element A and the focus evaluation value VB4' from the focus state detecting element B. In this case, the focus evaluation values VA4' and VB4' are approximately equal to each other so that the focus state cannot be detected.

Specifically, if the focusing position of the taking lens 12 is set at the position F5, the focus evaluation values VA5' and VB5' obtained from the imaging elements for focus state detection A, B at this focusing position are approximately equal to each other. So, in this case also, the focus state cannot be detected.

Figure 6:
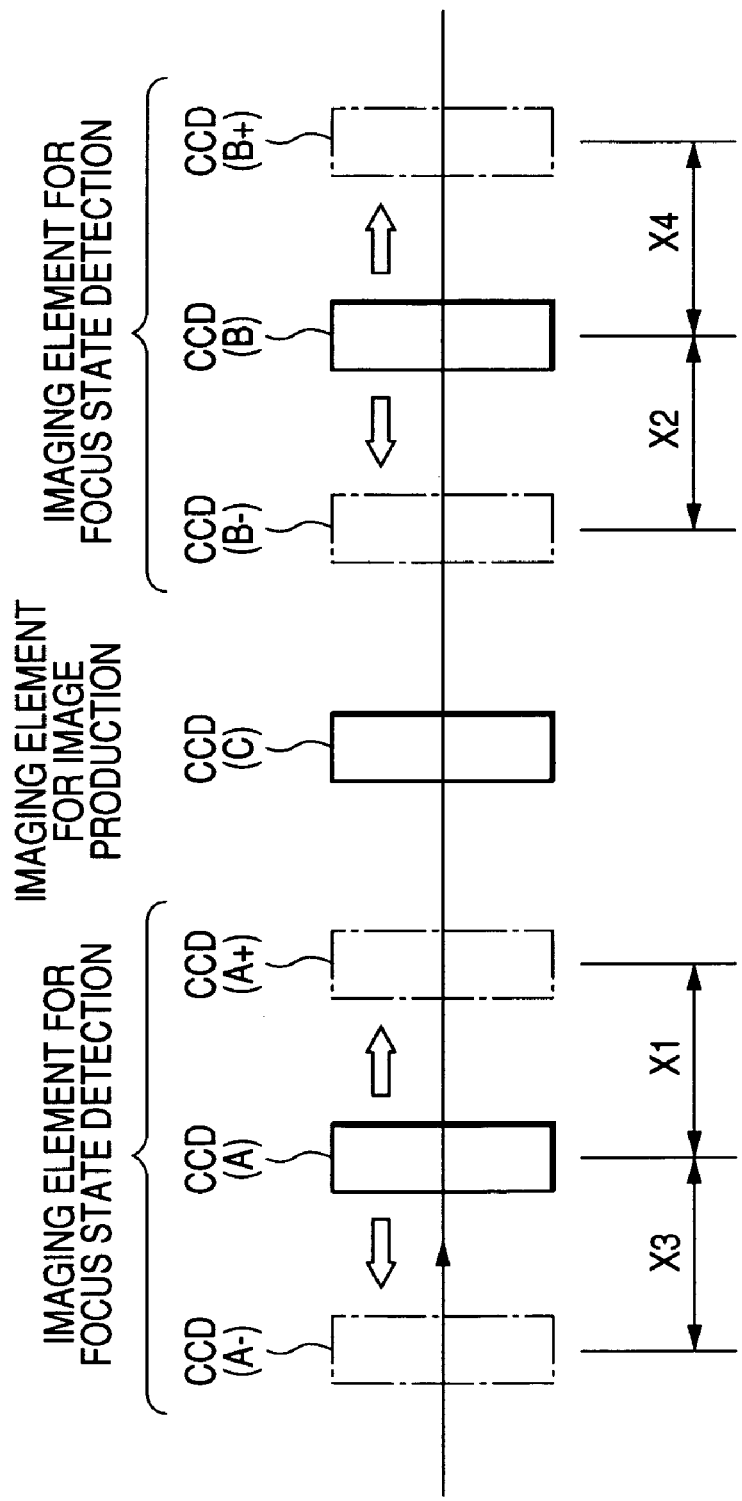
FIG. 6 is a view showing the equivalent positions of imaging elements for focus state detection and an imaging element for image production which are located on an optical axis in the focus detecting system according to an embodiment of this invention.

In such a case, if the positions of the imaging elements for focus state detection A and B are moved to increase the optical path length difference therebetween to cause the curves SA and SB to leave each other, thereby permitting the focus state to be detected. Specifically, as seen in FIG. 6, the focus state detecting element A is moved to the position where its optical path length is decreased by X3, whereas the focus state detecting element B is moved to the position where its optical path length is increased by X4 (Hereinafter, the moved to the position where its optical path length is decreased by X3 is referred as the focus state detecting element A−, and the focus state detecting element B moved to the position where its optical path length is increased by X4 is referred to as the focus state detecting element B+).

By causing the imaging elements for focus state detection A, B to leave the optical path length of the imaging element for image production C by the distances X3, X4 (symbols A−, B+), the focus evaluation values obtained from the imaging elements for focus state detection A−, B+ provide the focusing position moved corresponding to the distances X3, X4, thereby giving the curves SA−, SB+ indicated by solid line in FIG. 8. In this case, if the focusing position of the taking lens 12 is set at the position F4, the focus evaluation values obtained from the imaging elements for focus state detection A−, B+ are the values VA4", VB4" corresponding to the position F4 of the curves SA−, SB+, respectively.

Thus, it can be seen that the focus evaluation value VA4" obtained from the focus state detecting element A is larger than the focus evaluation value VB4" obtained from the focus state detecting element B. Accordingly, it can be determined that the focusing position of the taking lens 12 is in a state set on the near side with respect to the just focus position.

Likewise, if it is assumed that the focusing position of the taking lens 12 is set at the position F5 as seen from FIG. 8, by causing the imaging elements for focus state detection A, B to leave the imaging element for imaging production C by the distances X3, X4, it can be seen that the focus evaluation value VB5" from the focus state detecting element B is larger than the focus evaluation value VA5". Thus, it can be determined that the focusing position of the taking lens 12 is in a state set on the infinite side with respect to the just focus position.

Also, if the optical path length difference between the imaging elements for focus state detection A, B is made shorter, since more items of focus evaluated information can be obtained, the focus state can be detected more precisely. On the other hand, if the stop value of the iris 18 of the taking lens for image production 12 increases, the peak position of the focus evaluation value lowers, thereby giving an entire gently-sloping curve of the focus evaluation value. In such a case, inversely, by increasing the optical path length difference between the imaging elements for focus state detection A, B, the focus state can be detected more precisely. For this reason, it is preferable that the optical path length difference is changed by moving the imaging elements for focus state detection A, B according to the stop value of the iris 18.

As described above, if the group of zoom lenses 16 is adjusted, as the case maybe, it is difficult to detect the focus state. In order to obviate such an inconvenience, on the basis of the position data of the group of zoom lenses 16, the imaging elements for focus state detection A, B are moved to change the optical path length difference. Further, in the extender 21 which is a zooming system similar to the group of zoom lenses 16, the optical path length difference must be changed according to the kind of the lens unit 21a moved onto the optical axis O.

Figure 9:
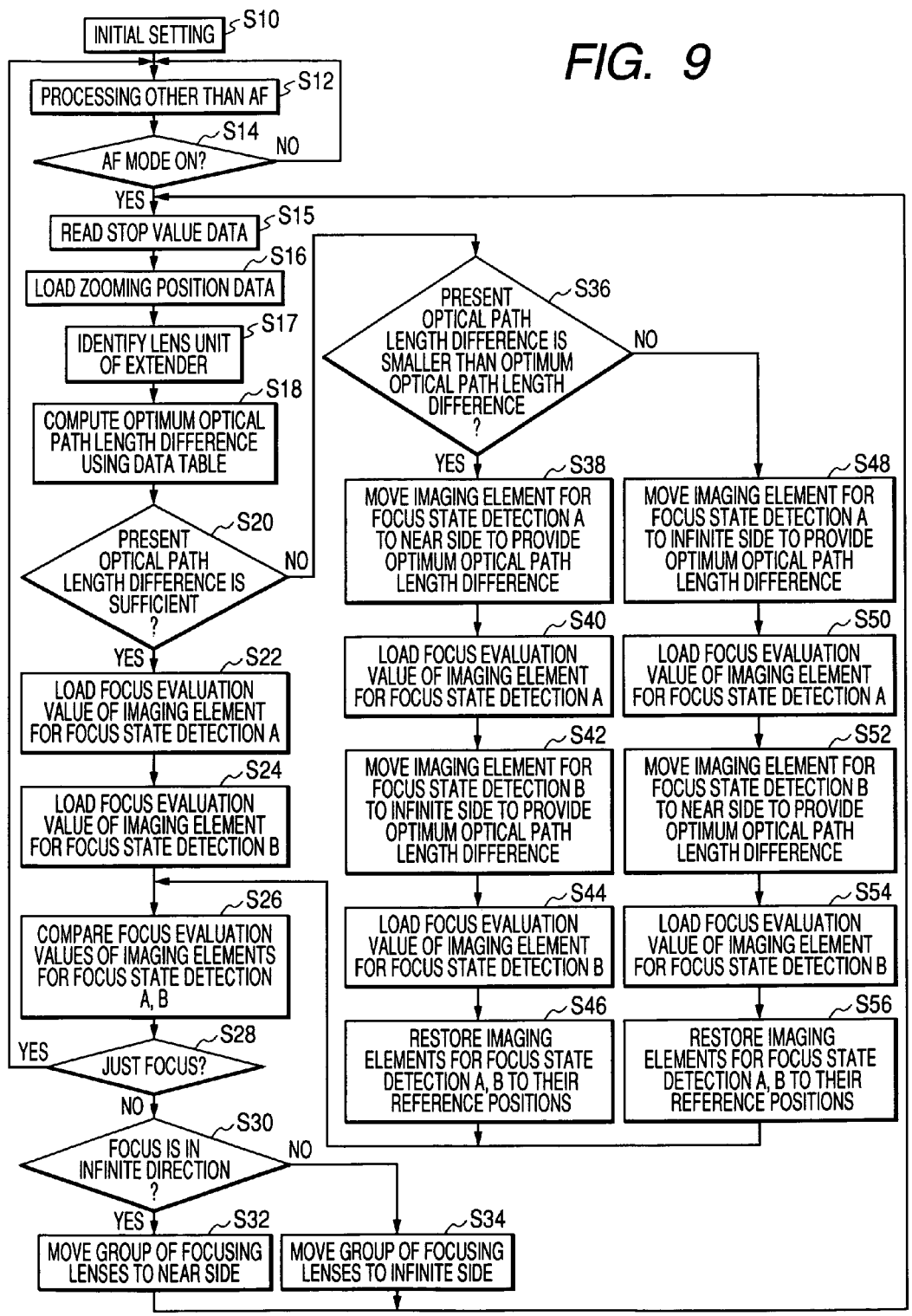
FIG. 9 is a flowchart showing the procedure of moving imaging elements for focus state detection in the focus detecting system according to an embodiment of this invention.

Now referring to the flowchart of FIG. 9, an explanation will be given of the procedure of changing the optical path length difference through the movement of the imaging elements for focus state detection A, B according to the stop value and the group of zoom lenses 16.

In step S10 of the flowchart, first, the CPU 72 makes required initial setting. In step S12, the CPU 72 makes the other processing than AF, such as control of the iris 18 in the taking lens 12.

Next, the CPU 72 confirms whether or not the focusing mode is an AF mode. In the AF mode, the following AF control will be carried out.

First, the CPU 72 loads the present stop value data of the taking lens 12 from the potentiometer 94 for the iris (FIG. 3) (step S15). Next, the CPU 72 loads the zooming position data of the group of zoom lenses 16 from the potentiometer 92 for the zoom lens (step S15). Further, the CPU 72 detects the kind of the lens unit 21a moved onto the optical axis from the sensor 106 for the extender (step S17).

The CPU 72 computes an optimum optical path length difference (difference between the optical path lengths of the imaging elements for focus state detection A and B) on the basis of these stop value data, zooming position data and kind of the lens unit, using the data table stored in the ROM (step S18).

The CPU 72 compares the optimum optical path length difference thus computed and the present optical path length difference (step S20). As a result of comparison, if it is determined that the present optical path length difference is within a permissible range for the optimum optical path length difference, the optical path length difference is not changed through the movement of the imaging elements for focus state detection A, B, but the focus state is detected as usual on the basis of the focus evaluation values obtained from the imaging elements for focus state detection A, B.

Specifically, the CPU 72 loads the focus evaluation value VA obtained from the focus state detecting element A (step S22). Next, the CPU 72 loads the focus evaluation value VB obtained from the focus state detecting element B (step S24). The CPU 72 compares the focus evaluation value VA from the focus state detecting element A and the focus evaluation value VB from the focus state detecting element B (step S26) to determine whether or not the focus state in the just focus state (step S28).

Whether or not the focus state is in the just focus state is determined by acquiring the difference ΔVA−VB between the focus evaluation value VA from the focus state detecting element A and the focus evaluation value VB from the focus state detecting element B and deciding whether or not the difference is zero. If the difference in the focus evaluation value ΔVA−VB is not zero, it is determined that the focus state is in the just focus state. Thus, the focus control is carried out. Specifically, the direction of deviation of the focus state is determined on the basis of the focus evaluation value VA from the focus state detecting element A and the focus evaluation value VB from the focus state detecting element B (step S30). If the focus is on the infinite side, the group of focusing lenses 14 is driven (step S32), thereby moving the focus to the near side. In step S30, if the focus is on the near side, the group of focusing lenses 14 is driven (step S34), thereby moving the focus to the infinite side. Until the just focus state is attained, i.e. the difference ΔVA−VB between the focus evaluation value VA from the focus state detecting element A and the focus evaluation value VB from the focus state detecting element B becomes zero, the procedure returns to the above step S16 to repeat the above processing.

On the other hand, in step S20, if it is determined that the present optical path length difference is outside the permissible range so that it is expected that it is difficult to detect the focus state, the CPU 72 compares the present optical path length difference and the acquired optimum optical path length difference to determine whether or not the present optical path length difference is smaller than the optimum optical path length difference (step S36).

As a result of comparison, if it is determined that the present optical path length difference is smaller than the optimum optical path length difference (i.e. the interval between the imaging elements for focus state detection A and B is smaller than the optimum interval), the CPU 72 shifts the position of the focus state detecting element A to the near side by a prescribed quantity (step S38). The CPU 72 drives the motor 46 to move the focus state detecting element A from a reference position so that the optical path length difference is increased. The CPU 72 loads the focus evaluation value VA of the focus state detecting element A based on the image signal captured by the focus state detecting element A at the moved position (step S40).

Next, the CPU 72 shifts the position of the focus state detecting element B to the infinite side by a prescribed quantity to provide the optimum optical path length difference (step S42). The CPU 72 supplies a control signal to the driving circuit 110 through the D/A converter 76 to drive the motor 46, thereby moving the focus state detecting element B from the reference position to increase the optical path length difference. The CPU 72 loads the focus evaluation value VB of the focus state detecting element B based on the image signal captured by the focus state detecting element B at the moved position (step S44).

After the focus evaluation values VA, VB of the imaging elements for focus state detection A, B have been loaded, the CPU 72 supplies the control signal to the driving circuit 110 through the D/A converter 76 to drive the motor 46, thereby restoring the imaging elements for focus state detection A, B to the reference positions (step S46).

Next, the procedure returns to step S26. The CPU 72 compares the loaded focus evaluation value VA of the focus state detecting element A and the loaded focus evaluation value VB of the focus state detecting element B to determine whether or not the focus state is in the just focus state (step S28).

On the other hand, if it is determined that the present optical path length difference is larger than the optimum optical path length difference (i.e. the interval between the imaging elements for focus state detection A and B is larger than the optimum interval) the CPU 72 shifts the position of the focus state detecting element A to the infinite side by a prescribed quantity (step S48). The CPU 72 drives the motor 46 to move the focus state detecting element A from a reference position so that the optical path length difference is decreased. The CPU 72 loads the focus evaluation value VA of the focus state detecting element A based on the image signal captured by the focus state detecting element A at the moved position (step S50).

Next, the CPU 72 shifts the position of the focus state detecting element B to the near side by a prescribed quantity to provide the optimum optical path length difference (step S52). The CPU 72 supplies a control signal to the driving circuit 110 through the D/A converter 76 to drive the motor 46, thereby moving the focus state detecting element B from the reference position to decrease the optical path length difference. The CPU 72 loads the focus evaluation value VB of the focus state detecting element B based on the image signal captured by the focus state detecting element B at the moved position (step S54).

After the focus evaluation values VA, VB of the imaging elements for focus state detection A, B have been loaded, the CPU 72 supplies the control signal to the driving circuit 110 through the D/A converter 76 to drive the motor 46, thereby restoring the imaging elements for focus state detection A, B to the reference positions (step S56).

Next, the procedure returns to step S26. The CPU 72 compares the loaded focus evaluation value VA of the focus state detecting element A and the loaded focus evaluation value VB of the focus state detecting element B to determine whether or not the focus state is in the just focus state (step S28). On the basis of the determination, the focus control is carried out. Namely, until the just focus state is attained, i.e. the difference $\Delta$VA–VB between the focus evaluation value VA from the focus state detecting element A and the focus evaluation value VB from the focus state detecting element B becomes zero, the above processing is repeated.

Additionally, if the difference $\Delta$VA–VB between the focus evaluation values is zero, it is determined that the focus state is in the just focus state. In this case, the focus control is not carried out, thus completing the AF control. Thereafter, the focus control is manually carried out until the focusing mode falls in the AF mode.

In this way, the taking lens 12 is focused to the object so that the object is imaged on an imaging screen of the imaging element.

In accordance with the focus detecting system according to this embodiment, the imaging elements for focus state detection are moved back and forth along the optical axis of the detecting object light to set the optimum optical path length difference therebetween so that the suitable focus state can be always detected.

The configuration of the focus detecting system according to this invention should not be limited to that proposed in the embodiment described above. For example, in the embodiment described above, although the imaging elements for focus state detection A, B were driven by the motor 46, they may be driven by the actuator using a piezoelectric element and the like Further, in the flowchart of FIG. 9, after the movement of the focus state detecting element A and loading of the corresponding focus evaluation value have been carried out, the movement of the focus state detecting element A and loading of the corresponding focus evaluation value is carried out. However, this order may be changed. Namely, after the movement of the focus state detecting element B and loading of the corresponding focus evaluation value have been carried out, the movement of the focus state detecting element A and loading of the corresponding focus evaluation value may be carried out. Further, after the imaging elements for focus state detection A, B have been moved simultaneously, the corresponding focus evaluation values may be loaded.

Further, in this embodiment, the focus state detecting state apparatus was applied to the taking lens in the television camera system for broadcasting. However, the focus detecting system according to this invention should not be applied to only such an application field, but may be applied to the taking lens of an existing camera such as a digital camera.

This application is based on Japanese Patent application JP 2004-060721, filed Mar. 4, 2004, the entire content of which is hereby incorporated by reference. This claim for priority benefit is being filed concurrently with the filing of this application.

What is claimed is:

1. A focus detecting system comprising:
an adjustable focus taking lens;
an imaging element for image production;
a plurality of imaging elements for focus state detection having an optical path length difference, the plural imaging elements for focus state detection capturing a divided object light directed to the imaging element for image production by the adjustable focus taking lens;
a moving unit for moving the plurality of imaging elements for focus state detection back and forth along each optical axis;
a central processing unit (CPU) configured to determine a focal length of the taking lens, the CPU configured to determine an optimum optical path length difference for the imagining elements based on the determined focal length of the taking lens;
an optical path length difference changing unit for changing the optical path length difference of imaging elements for focus state detection, by using the moving unit to independently and simultaneously change a position of each of the imaging elements for focus state detection to the determined optimum optical path length difference, the moving unit allowing the optical path length of each imagining element to be simultaneously increased or decreased independently of the other imagining elements; and,
wherein the focus detecting system detects the focus state based on image signals from the plurality of imaging elements for focus state detection.

2. The focus detecting system according to claim 1, wherein the plurality of imaging elements for focus state detection comprises a first imaging element for focus state detection and a second imaging element for focus state detection, and the moving unit comprises a first moving unit for moving the first imaging element for focus state detection and a second moving unit for moving the second imaging element for focus state detection.

3. The focus detecting system according to claim 1, wherein the optical path length difference changing unit changes the position of each of the imaging elements for focus state detection so that the optical path length difference increases as the focal distance of the taking lens increases.

4. The focus detecting system according to claim 1, which is applied to detection of the focus state in an autofocus system for controlling a focus so that the focus of the adjustable focus taking lens is located at a just focus position.

5. The focus detecting system of claim 1, wherein the CPU is configured to determine the optimum optical path length difference for the imagining elements by using a stop value, a zoom position, and a determination of a type of lens used.

6. A focus detecting method for detecting a focus state of an adjustable focus taking lens, comprising:
computing an optimum optical path length difference between a first imaging element for focus state detection and a second imaging element for focus state detection;
comparing a present optical path length difference with the optimum optical path length difference;
moving the first imaging element for focus state detection and the second imaging element for focus state detection, when the present optical path length is not satisfied with the optimum optical path length difference, the moving of the first imaging element and the second imaging element occurring independently ,and simultaneously of each other, the moving unit allowing the optical path length of the first imagining element to be increased or decreased simultaneously and independently of the second imagining elements; and
detecting the focus state.

7. The focus detecting method according to claim 6, wherein the method comprises:
when the present optical path length is smaller than the optimum optical path length difference, moving the first imaging element for focus state detection toward a near side and loading a first focus evaluation value, and moving the second imaging element for focus state detection toward an infinite side and loading a second focus evaluation value;
when the present optical path length is larger than the optimum optical path length difference, moving the first imaging element for focus state detection toward the infinite side and loading the first focus evaluation value, and moving the second imaging element for focus state detection toward the near side and loading the second focus evaluation value;
comparing the first focus evaluation value with the second focus evaluation value; and
completing detecting the focus state when the first focus evaluation value and the second focus evaluation value have a same value.

8. The focus detecting method according to claim 7, wherein the method comprises: when the first focus evaluation value and the second focus evaluation value have a different value, moving a focusing lens towards the near side in a case where a focus position is in the infinite side, and moving the focusing lens towards the infinite side in a case where the focus position is in the near side.

9. A computer readable medium including a set of instructions for detecting a focus state of an adjustable focus taking lens, the set of instructions comprising:
computing an optimum optical path length difference between a first imaging element for focus state detection and a second imaging element for focus state detection;
comparing a present optical path length difference with the optimum optical path length difference;
moving the first imaging element for focus state detection and the second imaging element for focus state detection, when the present optical path length is not satisfied with the optimum optical path length difference, the moving of the first imaging element and the second imaging element occurring independently and simultaneously of each other, the moving unit allowing the optical path length of the first imagining element to be increased or decreased simultaneously and independently of the second imagining elements; and
detecting the focus state.

10. The computer readable medium according to claim 9, wherein the set of instructions comprises:
when the present optical path length is smaller than the optimum optical path length difference, moving the first imaging element for focus state detection toward a near side and loading a first focus evaluation value, and moving the second imaging element for focus state detection toward a infinite side and loading a second focus evaluation value;
when the present optical path length is larger than the optimum optical path length difference, moving the first imaging element for focus state detection toward the infinite side and loading the first focus evaluation value, and moving the second imaging element for focus state detection toward the near side and loading the second focus evaluation value;

comparing the first focus evaluation value with the second focus evaluation value; and completing detecting the focus state when the first focus evaluation value and the second focus evaluation value have a same value.

11. The computer readable medium according to claim 10, wherein the set of instructions comprises:

when the first focus evaluation value and the second focus evaluation value have a different value, moving a focusing lens towards the near side in a case where a focus position is in the infinite side, and moving the focusing lens towards the infinite side in a case where the focus position is in the near side.

* * * * *